ANALOG NETWORK TELEPHONE SWITCHING SYSTEM

Filed Sept. 30, 1964 3 Sheets-Sheet 1

ANALOG NETWORK TELEPHONE SWITCHING SYSTEM

FIGURATIVE SWITCHING NETWORK

3,414,679
ANALOG NETWORK TELEPHONE SWITCHING SYSTEM

Albert Regnier, Issy-les-Moulineaux, and Jean-Jacques René Paul de Buck, Paris, France, assignors to International Standard Electric Corporation, New York, N.Y., a corporation of Delaware
Filed Sept. 30, 1964, Ser. No. 400,600
Claims priority, application France, Oct. 3, 1963, 949,414
5 Claims. (Cl. 179—18)

ABSTRACT OF THE DISCLOSURE

The invention provides a network of gates which simulate the crosspoints in a switching network. A train of time related pulses are applied to the gates. As these pulses flow through the gates time related signals are detected and used to select the crosspoints actually operated in the network to complete a switch path.

This invention relates to telephone or similar switching systems of the type controlled by an electronic analog or simulation of a network of switching grids interconnected by separate links. There are known methods of selecting a network connecting path responsive to the selection of a path between an upper terminal point and a lower terminal point in the analog network. In the analog network, each "node" device corresponds to a cross-point in the switching grids. These nodes are mutually multiplied through links corresponding to the separate links of the switching network.

In the analog network, a sequence of link and node selections is made by applying a marking to the node corresponding to the upper point, and thereafter causing it to pass along a number of paths which spread down along all possible paths. The available links and successive nodes are marked available or not in the analog network. The marking performs a selection among the links through which it passes until it reaches a node designated as the lower point.

In the first selection, the node is that which corresponds to the desired lower terminal point in the switching network. In each subsequent selection, the selected node is associated with the link selected in the preceding selection. Thus, a selection of a connecting path in the actual switching network is carried out by a process of selection which proceeds step by step through the analog network.

According to the described method clock pulses are distributed cyclically as a function of time. Each pulse of the cycle is allotted and applied to a corresponding node inlet to enable it temporarily. The downward marking enters the various nodes through the inlets thereof. Thus, there is a form of a pulse train, and the identity of the links and nodes through which the train has passed to reach this point is defined by the time-position of the corresponding pulses in the train. An identification and selection device makes a similar connection with the note designated as the lower point in the desired path segment. That selected node receives the entering pulse train and identifies the active links from the time-position of the pulses. Then, the system selects one of these links and, in turn, designates the preceding corresponding node together with the link between the selected nodes. This then establishes the lower point for making the next path segment selection.

The path segment known switching network also provides overflow facilities, or more generally, tracks which are mapped out by the links through a plurality of nodes. But these systems limit the selection to the shortest paths, traversing the least number of nodes. To this end, the marking which spreads down along the various possible paths traverses the nodes in synchronism. Thus, the first pulse train reaching the desired end point does so through the downward marking which is the shortest path. Link selection is limited to the path identified by this first pulse train, as by blocking the other node inlets after this pulse cycle. Thus, the known system eliminates the longer paths by which the downward marking would reach this node during the following cycles.

According to the invention, the principles of this known system are extended to control switching networks in which the matrices are not fully equipped. For example, some crosspoint positions may be left vacant in order to provide room for expansion when future growth occurs. Sometimes in the past these partially equipped matrices have been called "defective"; however, that word is somewhat inadequate since it implies inoperativeness. Hence, this specification uses the words "partially equipped" to describe matrices wherein grid inlets may be connected to certain outlets via only several equipped crosspoints to the exclusion of other unequipped crosspoints. Another non-standard matrix comprises "mediate" switching grids in which the input multiples ("horizontal") are parallel with the output multiples (also "horizontal") and the connections are established between them via two crosspoints connecting multiples ("vertical") which cross the input and output multiples. Still another non-standard matrix comprises grids which are both mediate and partially equipped where the input and output multiples may be connected to certain connecting multiples only.

When the downward flowing marking pulses reach a node representing a partially equipped matrice, the pulses can appear at those points which can be reached through the equipped inlets. To achieve this result, a translator is used which identifies the outlets that can be reached responsive to a marking applied through that inlet. Subsequently, the selection of an inlet is limited to those which can reach the designated outlet. To do so, the device must again refer to a translator which designates the inlets through which the marking can be applied in order to reach the designated outlet.

In the case of the mediate switching matrices, the selection of a connecting multiple must come before that of an input link. Therefore, two successive selections must be made in the designated node, for a designated output link, in order to select an input link and designate the preceding node from which it originates as the lower point for the next selection. In the case of combined mediate and partially equipped matrices, the device for controlling the passage of the marking must further refer to a translator which designates both the connecting multiples available to the active input links and the outlets which can be reached by the connecting multiples. At the time of the double crosspoint selection, the translator indicates the connecting multiples which can reach the designated outlet. Thereupon, the system selects an active inlet which can reach the selected connecting multiple.

Further features and advantages of this invention will become more apparent from the following description of embodiments thereof, with reference to the accompanying drawings, in which.

Figures 1, 2, 3:
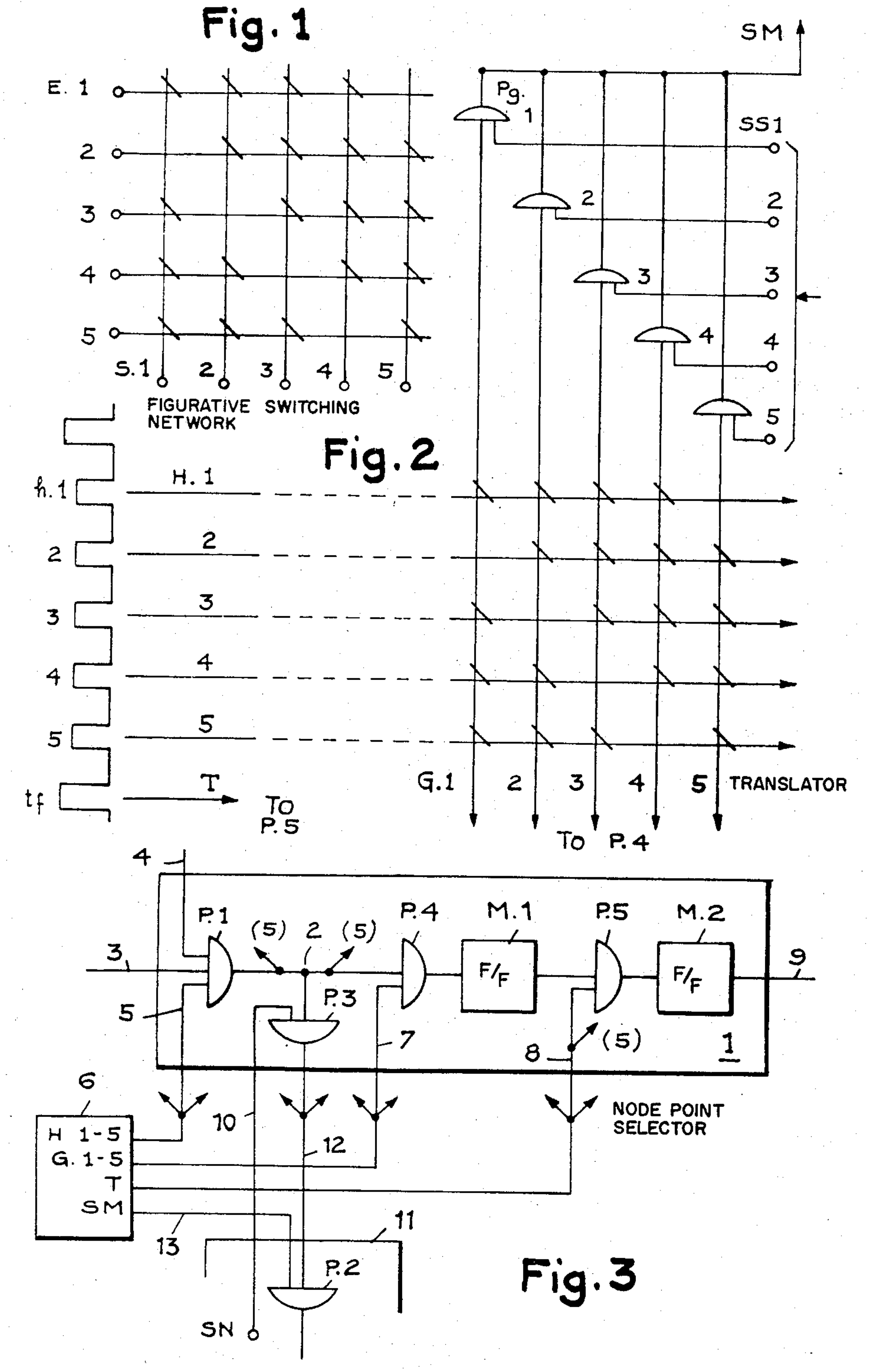
FIGURE 1 is a schematic diagram of a partially equipped switching grid.
FIGURE 2 is a schematic diagram of a translator corresponding to this grid.
FIGURES 3 and 4 are schematic diagrams of two embodiments of a corresponding electronic analog node and of its connections with the pulse distributor, identification, and selection device.

According to the invention an electronic analog of a switching network involving partially equipped grids is arranged so that a given inlet may establish a connection with any of certain outlets, but not with all of them. Correlatively, a given outlet may be reached from certain inlets but not from all. The partially equipped schedule, represented by way of example in FIG. 1, is defined as follows:

| | |
|---|---|
| Inlet 1: outlets 1, 2, 3, 4 | Outlets 1: inlets 1, 3, 4, 5. |
| Inlet 2: outlets 2, 3, 4, 5 | Outlet 2: inlets 2, 4, 5, 1. |
| Inlet 3: outlets 3, 4, 5, 1 | Outlet 3: inlets 3, 5, 1, 2. |
| Inlet 4: outlets 4, 5, 1, 2 | Outlet 4: inlets 4, 1, 2, 3. |
| Inlet 5: outlets 5, 1, 2, 3 | Outlet 5: inlets 5, 2, 3, 4. |

When the downward marking reaches an inlet of a node in the analog network, it cannot be allowed to pass through this node unless the switch path is directed to an outlet which may be reached from this particular inlet. When the marking reaches a group of inlets, it appears at all outlets accessible to this group of inlets.

The inlets allow the marking to pass at different time positions. This means that a given outlet may be reached from more than one inlet. The marking thus appears at this outlet irrespective of whether it has been reached only once or several times. Similarly, when a node outlet is designated as the lower point of a stage, the selection bears on only the inlets of the same node which have access to the selected outlet.

Use is made of a translator memory device. This translator is consistent with the connection diagram of the matrice that is represented by the node in which a marking or selection is made. A common translator is provided for each connection diagram that is used in the network.

In greater detail, a translator corresponding to the schematic diagram of FIG. 1 is represented by way of example in FIG. 2. This translator is a diode grid, the horizontal multiples H.1.5 of which correspond to the inlet multiples E.1–5 of the switching grid (FIG. 1). The vertical multiples G.1–5 which cross the horizontal multiples H.1–5 correspond to the outlet multiples S.1–5 of FIG. 1. A cyclic time-distributor (not shown in FIG. 2) delivers successive pulses *h*.1–5. The time-positions of these pulses identify the node inlets by applying the same pulses to wires H.1–5 respectively. Each pulse is distributed in space by the diode grid to a group of outlets among the multiples G.1–5 in accordance with the access which each inlet of the matrice of FIG. 1 has to a group of outlets.

The outlets of the multiples H.1–5 are multiplied on the corresponding inlet gates P.1 (FIG. 3) of all nodes representing matrices having the same schematic diagram of equipped crosspoints. The outlets of multiples G.1–5 are similarly connected to the corresponding outlet gates P.4 in the same nodes. In addition, each G.1–5 multiple is connected to one of the two inlets of corresponding gates P*g*.1–5. The other of the two inlets receives a marking from the points SS.1–5 responsive to a selection of inlets with regard to the availability of outlet designated by the application of a marking to one of the points. A common wire SM carries the outputs from gates P*g*.1–5 to gate P.2 in the identification and selection device 11, FIG. 3.

In the downward marking process, each pulse *h*.1–5 enables a node inlet and thus simultaneously opens the outlets to which this inlet has access. With the diagram shown by way of example, the marking reaches any two inlets and then passes on to all outlets of node.

When selecting an inlet, starting from a designated outlet, the identification device receives the pulses entering the node that is considered the lower point for this operation. These pulses enter through the active inlet gates which are reached by the downward marking (and which equip available links). In the translator, the marking of one of the gates P*g*.1–5 from one of the points SS.1–5 allows a passage to output wire SM of only those pulses which are allotted to the inlet gates having access to the designated outlet. With the diagram represented here, the marking of a gate P*g*.1–5 bars only the pulse applied to the sole inlet gate which does not reach the designated outlet. For instance, if point SS.2 and gate P*g*.2 (FIG. 2) are marked to designate outlet S.2 (FIG. 1) pulse *h*.3 is notable to pass, because inlet E.3 has no access to outlet S.2.

An example of a node device representing the partially equipped matrice of FIG. 1 is shown in FIG. 3. Node device 1 comprises a central point 2 which is multiplied to the five inlet gates P.1/1–5 and to the five output circuits including gates P.4/1–5.

Gates such as P.1 are 3-inlet "AND" gates. The downward marking is appled to them by links 3, the availability marking by wires 4, and the time-position pulses by wires 5. Wires 5 start from the outlets of multiples H.1–5 (FIG. 2) in the distributor 6. The translator is here assumed to be directly associated with the distributor.

Gates P.4 are 2-inlet "AND" gates. The other inlet of these gates is connected by wire 7 to one of the outlets of multiples G.1–5 (FIG. 2). Through the translator the same pulse which is applied by wire 5 to an inlet gate P.1 is also applied by wires 7 to all those P.4 gates to which gate P.1 should have access according to the matrice's schedule. Through gates P.4/1–5, the pulses are applied to flip-flop devices M.1/1–5 which establish, at their outlet, standard marking irrespective of their being reached by only one pulse or more.

This standard marking is applied to "AND" gates P.5/1–5. These are 2-inlet gates and their other inlet is connected by wire 8 to the end-of-cycle outlet T of distributor 6. This wire receives the end-of-cycle pulse *t* from the distributor. After all the P.1 gates have been activated successively by the *h*.1–5 pulses, the *t* pulse applied to all the P.5 gates allows the marking which is standing at the outlet of flip-flops M.1/1–5 to reach the second flip-flop devices M.2/1–5.

These flip-flops are set to establish a standing marking at the outlets 9 of the node, which connect to the links that go to the inlets of the next following nodes in the analog network. For instance, if inlets 1 and 2 are available and may be reached by the downward marking, the flip-flop devices M.1/1, 2, 3, 4 establish an outlet marking at the instant *h*.1 when inlet 1 has access to outlets 1, 2, 3, 4. The flip-flop M.1/5 establishes an outlet marking at instant *h*.2 because outlet 5 is reached through inlet 2. The outlets 1, 2, 3, 4 have already been marked responsive to a pulse inlet 1. Therefore, the marking appears at the outlet of all flip-flop devices M.1/1–5. Finally, at the instant *t* which follows the pulse cycle *h*.1–5, all flip-flops M.2/1–5 release the marking which passes on to the outlets 9. Thus, during the next distribution cycle, a standing marking is applied to the inlets of the following nodes which are connected to the links 9 that originate in the node shown in FIG. 3.

The inlet selection point 2 of the node is connected to the inlet of gate P.3. This gate is a 2-inlet "AND" gate. The other inlet of the gate is connected by wire 10 to a marking point SN in an identifier 11. The node is taken as the lower point in the selection, and its inlets must be scanned. The outlet of gate P.3 is connected by wire 12, in identifier 11, to one inlet of a gate P.2. The function of gate P.2 is to control the inlet pulses in accordance with their access capabilities as regards the outlet designated for the selection.

Gate P.2 is also a 2-inlet "AND" gate. Its other inlet is connected by wire 13 to outlet SM of the translator, FIG. 2. The outlet SM allows the passage of pulses *h*.1–5 which are applied to gates P.1–5, but only if the outlet designated by the marking of a P*g*.1–5 gate may be reached from the inlets to which these pulses are allotted. In the arrangement here assumed, wire 12 is multipled on gates P.3 of the nodes which are partially equipped according to the same schedule and which are, therefore, controlled by the same translator. The number of P.2 gates in the identifier corresponds to the number of unequipped crosspoints in the matrices of the switching network. Therefore, there are an equal number of translators associated with distributor 6. However, other arrangements are possible.

As regards the association of devices in space, it has been assumed, in FIG. 3, that the translator or translators are placed in distributor 6. It will be understood, however, that they might also be placed in identifier 11. They would, then, be connected to distributor 6 by a branch of multiple H.1–5. Connections from outlets G.1–5 to wires 7 would start from identifier 11. Connection 13 between outlet SM and gate P.2 would be an internal connection in the identifier.

Figure 4:
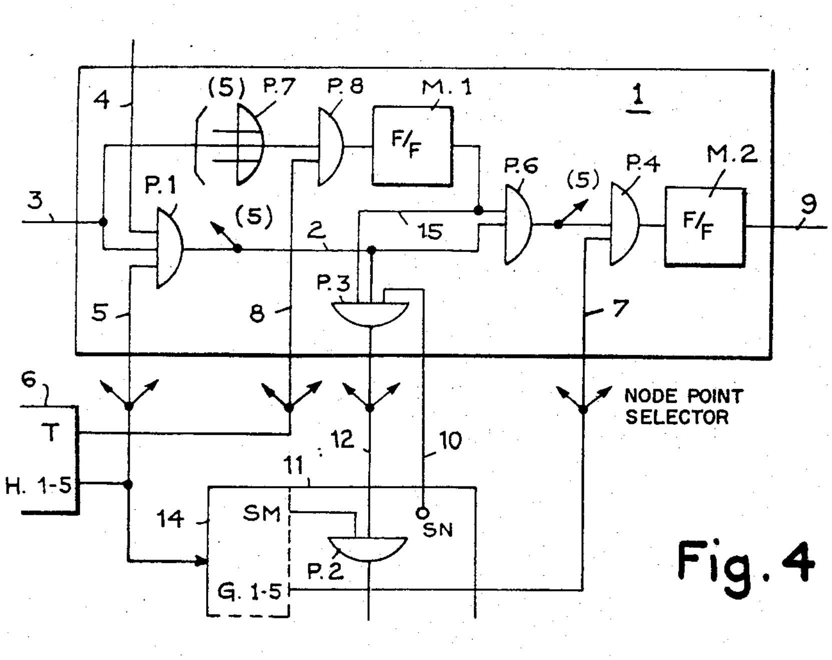

Another example of a node device is shown in FIG. 4, which uses the above-mentioned arrangement, with translator 14 located in identifier 11. In this node device, the first flip-flops M.1/1–5 which were positioned in the outlets of the arrangement FIG. 3 are replaced by a single flip-flop M.1 associated with the node itself. This implies a transposition in the control of the two flip-flops.

In the arrangement of FIG. 3, the first flip-flops M.1/1–5 were controlled by the successive pulses *h*.1–5 and the second were all controlled at the same time by the following end-of-cycle pulse *t*. In the arrangement of FIG. 4, a first and single flip-flop M.1 is controlled by a framing pulse *t* which precedes the clock pulse train *h*.1–5. The second flip-flops M.2/1–5 are controlled by the pulses of this train. The framing pulse *t*, which precedes the clock pulse train *h*.1–5 is also the framing pulse *t* which follows the preceding clock pulse train *h*.1–5 that controlled the second flip-flops of the preceding nodes in the network. In other words, distribution cycle of clock pulses *h*.1–5 is preceded by a framing pulse *t* in the embodiment of FIG. 4.

The link wires 3 apply a standing marking from the preceding node responsive to one of the clock pulse trains *h*.1–5. In accordance with the diagram of the network, the standing markings correspond to the schedule of the partially equipped matrices, and the link availability. One may assume, for instance, that inlet 3 shown on FIG. 4 is connected to outlet 1 of the preceding node. The connection schedule of that node is, in turn, that shown in FIG. 1, and it is further assumed that the inlet 1 of that node is busy. Therefore, in the pulse cycle which caused an appearance of the marking for link inlets 3, pulse *h*.1 did not pass through the inlet 1 of the preceding node because it is busy. Pulse *h*.2 did not pass because inlet 2 of the preceding node has no access to outlet 1. Pulse *h*.3 did not pass if it is assumed that inlet 3 of the preceding node was not reached by the marking. Pulse *h*.4 did pass, and it comes out at the second flip-flops 1, 2, 4, 5 of the preceding node. With the assumptions made, the link inlet 3 of the node shown in FIG. 4 receives a standing marking beginning with the instant *h*.4 of the preceding cycle. The other node inlets (not shown), which are connected by links to outlets 2, 3, 4, 5 of the same preceding node, are marked from instant *h*.2 since inlet 2 of the preceding node has access to these outlets.

In node 1, link 3 separates into two branches, one of which is equipped with gate P.1, as described above. The other two inlet wires for gate P.1 are wire 4 for the availability, and wire 5 for a time-position pulse. The other branch of link 3 is connected to the corresponding inlet of an "OR" gate P.7 which has an inlet for each link 3 reaching this node. The outlet of gate P.7 is connected to an inlet of a 2-inlet "AND" gate P.8 which is controlled by the framing pulse *t* applied to its other inlet. The framing pulse *t* follows the preceding pulse train which established the marking on links 3. This pulse delivers a corresponding pulse at the outlet of gate P.8, subject to the condition that at least one of the links 3 is marked. The outlet of gate P.8 is connected to the first flip-flop M.1, which causes a standing marking to appear on its outlet responsive to the framing pulse *t*.

The outlets of all gates P.1 are connected to the central point constituted by wire 2. This wire, in turn, is connected to an inlet of a 2-inlet "AND" gate P.6. The selection gate P.3 is also connected to central point 2, the outlet of which leads to gate P.2 in the identifier circuit 11. Gate P.3 is here shown as a 3-inlet "AND" gate. Its second inlet is marked by identifier 11, the marking being applied through point SN and wire 10 in order to enable this gate to identify the node as the lower point for this selecting operation. The outlet of flip-flop M.1 is connected to the second inlet of gate P.6 and to the third inlet of gate P.3. The pulses which pass through gates P.1 during the time-positions in the cycle which controls node 1, pass through gate P.6 after the framing pulse *t* which caused the standing marking to appear at the outlet of flip-flop M.1. The outlet of gate P.6 is multipled to the outlet of gates P.4/1–5 which are controlled by the access pulses delivered by multiples G.1–5. At each outlet, gate P.4 is followed by a second flip-flop M.2/1–5.

The standing marking, established on links 3 by the successive pulses *h*.1–5 of the preceding train, reaches gate P.8 via gate P.7 at the moment when the first of these pulses occurs, but it does not go through this gate at that moment. Some pulses of the same cycle may also pass through gates P.1/1–5 when these gates are activated by the pulses in time-positions which are later than the positions during which the marking was applied to the respective links 3 (or it could possibly be in the same time-positons.) These pulses reach gate P.6, but they do not proceed further for the moment.

At the instant *t* which follows the pulse cycle controlling the preceding node and which precedes the cycle which will control the node 1, the marking passes through gate P.8 and stands *t* the outlet of flip-flop M.1, where it is applied to the other inlet of the gate P.6. However, no pulse *h*.1–5 is present on wire 2 at the instant *t* when this standing marking reaches gate P.6. Thus, this marking does not yet pass through the gate P.6. The next pulse cycle *h*.1–5 allows pulses to pass through all gates P.1 at the links 3 which have been marked during the time-positions defines pulses appearing on wires 5 coming from multiples H.1–5.

Since the marking delivered by the flip-flop M.1 is now standing at the gate P.6, the pulses *h*.1–5 of the current cycle pass through the gate P.6 and reach all outlet gates P.4. However, these pulses traverse only those of the gates which are actuated by potentials on the wires 7 which lead from the translator, in accordance with the schedule of partially equipped crosspoints. The first pulse coming from one of the P.1/1–5 gates, which traverses gate P.6 also traverses the group of gates P.4 to which this gate P.1 has access. It is transformed into a standing marking at the outlet of the associated flip-flops M.2. The pulses which may subsequently come from the other P.1 gates may traverse the same P.4 gates, as well as other P.4 gates, and they are transformed in a standing marking at the outlet of the other flip-flops M.2/1–5 which they may reach. The standing markings thus established on these outlets during one or several time-positions of the pertinent time cycle immediately reaches the inlets of the next following nodes which are connected to the outlet links 9 of the node which is shown in FIG. 4. There, the marking produces the effects which have been described above, i.e. it may traverse gates P.1 and reach gate P.6 along wire 2 without passing through this gate. Besides, it reaches gate P.8 where it awaits the next pulse $t$ to pass through toward flip-flop M.1.

With regard to the selection process, the pulses $h$.1–5 of the preceding pulse train which may traverse gates P.1, reach gate P.3 and stop there, since one of the inlets of the gate P.3 has not yet been marked by flip-flop M.1. The marking takes place responsive to the pulse $t$ which is supplied by the distributor between the preceding $h$.1–5 train and the $h$.1–5 train which is to control selection is node 1. This new pulse train passes through all available gates P.1 which have been reached by the marking of their links 3. It finds gate P.3 marked by flip-flop M.1, passes through the gate, and reaches identifier 11, in which gate P.2 has the same function as in FIG. 3.

Figure 5:
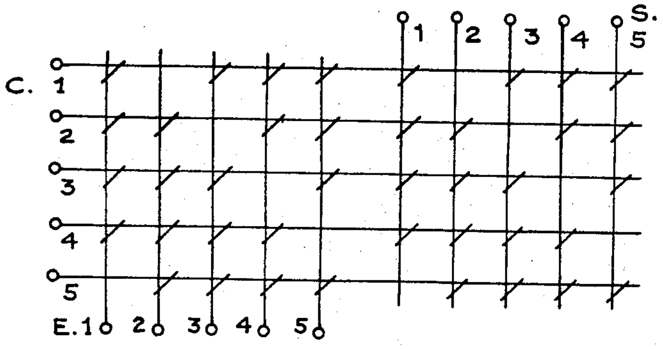
FIGURE 5 is a schematic diagram of a combined mediate and partially equipped switching grid.

FIG. 5 illustrates an example of mediate switching grids. Outlets S.1–5 are carried by multiples parallel with inlet multiples E.1–5 (which could be horizontal, for instance, but which are shown vertically in FIG. 5). Connections are made between inlets and outlets via connecting multiples C.1–5. Each connecting multiple crosses both inlet and outlet multiples (horizontal in FIG. 5). Therefore, the connection from an inlet to an outlet passes through two crosspoints. The matrice of crosspoints between inlets and connectors, or connectors and outlets, or both, may not be fully equipped. The grids are then faced with problems related to both mediate and partially equipped matrices. FIG. 5 illustrates this case, the equipped schedule is chosen to be the same between inlets and connectors and between connectors and outlets, in order to simplify the description.

The media switching raises no difficulty as regards the passage of the downward marking. It is enough to mark the availability of the connectors in the same manner as the availability of the inlets is marked. However, some new and more particular arrangements are necessary when the mediate matrix has a partially equipped switching schedule. The selection now involves an important difference. Starting from a designated outlet, a connector must first be selected. Then an inlet must be selected, starting from this connector. Therefore, there is a pulse cycle which identifies and characterizes the inlets, and another pulse cycle which identifies and characterizes the connectors. The selection of a connector and of an inlet may be carried out in almost the same manner. However, this invention avoids the continuous distribution of two cycles of time-position pulses which would be similar to the distribution of a pulse train for units following a pulse train for tens. In an arrangement characteristic of the invention, the cycle related to the connectors is distributed in a continuous manner while the cycle related to the inlets is distributed only in the inlet-selection operation which follows the selection of a connector.

Figure 6:
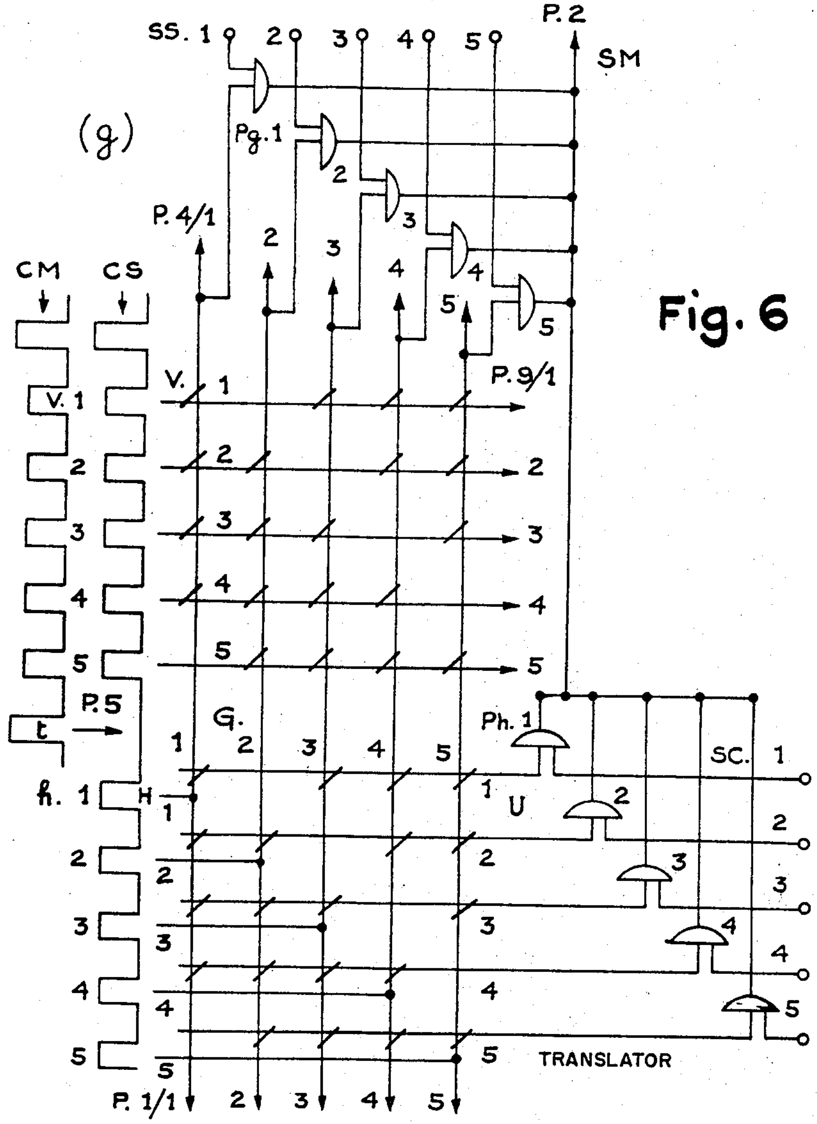
FIGURE 6 is the schematic diagram of a corresponding translator.

FIG. 6 shows a translator corresponding to the matrix schedule diagram of FIG. 5. To cause the progression of the downward marking from one node stage to the next, the distributor delivers pulse cycles CM comprising a train of pulses $v$.1–5 followed by a framing pulse $t$. Pulses $v$.1–5 characterize the vertical multiples of the matrice (i.e. the connectors, which are shown horizontal in FIG. 5). To cause a selection in a given node, when this is reached by the downward marking, the distributor delivers a selection cycle CS comprising a last train of pulses $v$.1–5, after which the framing pulse $t$ is omitted. The train is followed by a train of pulses $h$.1–5 characterizing the horizontal inlet multiples of the matrix (which are vertical in FIG. 5). The pulses $v$.1–5 are applied, respectively, to five multiples V.1–5. The multiples V.1–5 are connected to the multiples G.1–5 which cross them according to the diagram of FIG. 5. Multiples G correspond to multiples E and multiples V correspond to multiples C. The pulses $h$.1–5 are applied, respectively, to five multiples H.1–5 which cross multiples G.1–5. As regards pulses $h$.1–5, multiples G.1–5 are connected, according to the same diagram, to other multiples U.1–5 representing the same connectors. Suitable steps are taken to prevent the pulses $v$.1–5 which reach multiples G through multiples V from progressing along multiples U which should be reached only by pulses $h$.

The first phase of a selection includes the passage of the downward marking. Multiples V.1–5 receive pulses $v$.1–5 and distribute them to multiples G.1–5. The outlets of multiples V.1–5 are connected to the availability gates of the respective connectors in the nodes as will be seen at (P.9/1–5). Multiples G.1–5 are connected, in the nodes, to the respective inlet gates (P.1/1–5) as well as to the first outlet flip-flops (gates P.4/1–5). In the translator itself (FIG. 6) multiples G.1–5 are also connected to gates P$g$.1–5. These gates are associated with inlet marking points SS.1–5 and an outlet marking wire SM leading to gate P.2 in the identification device, as in the translator of FIG. 2. These gates P$g$.1–5 take part in the selection of a designated connector outlet.

During the second phase of the selection, or selection of an inlet with regard to a designated connector, multiples G.1–5, respectively, receive pulses $h$.1–5 and distribute them to multiples U.1–5. These multiples are connected, in the translator itself, to the first inlets of "AND" gates P$h$.1–5. The second inlets of these gates are controlled by marking points SC.1–5 which designate the connector selected during the first phase of the selection. The outlets of gates P$h$.1–5 are connected in parallel with the outlets of gates P$g$.1–5 to the same wire SM.

Figure 7:
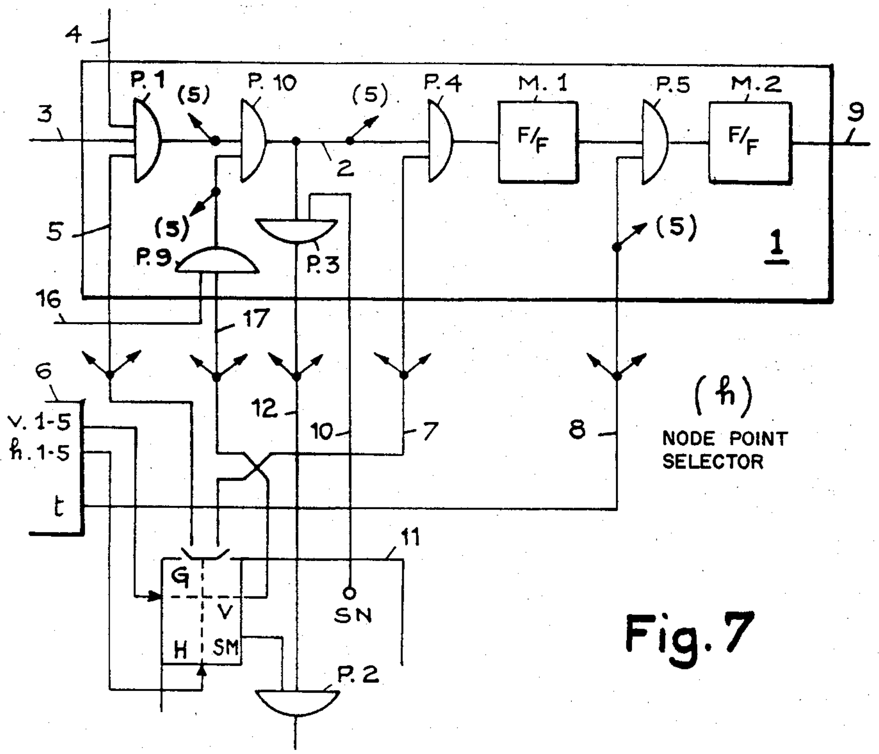
FIGURE 7 is a the schematic diagram of an embodiment of a corresponding electronic analog node and its connections with the distributor, the identification, and the selection device.

FIG. 7 shows an example of node device representing the switching matrix of FIG. 5 and controlled by the translator of FIG. 6. It is similar to the node illustrated by FIG. 3. The translator 14 may be placed in an identifier 11, as in FIG. 4.

Each incoming link wire 3 is connected to an inlet of a 3-inlet "AND" gate P.1. The other inlets of this gate are connected respectively tot he availability wire 4 and to a time-position pulse wire 5. However, the wires 5 receive the pulses of the cycle allotted to the inlets only during the selection of an inlet. During the passage of the downward marking through the successive nodes and the first phase of selection in the designated node, wires 5 receive from multiples G.1–5 the translated $v$.1–5 pulses.

The outlets of gates P.1/1–5 are connected in parallel to an inlet of a 2-inlet "AND" gate P.10. For the identification of connectors, the node comprises a set of gates P.9/1–5 which are similar to gates P.1/1–5. These are "AND" gates, one inlet of which receives the availability marking of the connector from wire 16 while the other inlet receives the corresponding pulse of train $v$.1–5 from wire 17. The time-positions of these pulses designate the connector. The outlets of gates P.9/1–5 are connected in parallel to the other inlet of gate P.10. The outlet of gate P.10 is connected to the central wire, 2, of the node which is multipled on the first outlet gates P.4/1–5. These gates receive translated pulses from wires 7 and they are delivered by multiples G.1–5. The outlet of each of the P.4/1–5 gates is connected to the inlet of a first flip-flop M.1/1–5 which delivers a standing marking. This marking begins at an instant in the cycle $v$.1–5 which depends on circumstances in the switching process.

Memories M.1 are followed by "AND" gates P.5 and memories M.2. Gates P.5 receive the framing pulse $t$ from wires 8. These pulses follow the cycle during which the standing marking may have appeared at the outlet of memories M.1/1–5. From that instant $t$, the flip-flops M.2/1–5 deliver a standing marking to the outlet links 9. This instant is the same for all nodes of the same level or rank. That is, the instant is the same for the nodes in all parallel paths if the marking passes through the same number of preceding nodes. Again, a gate P.3 is connected to central wire 2 for the selection process. The other inlet of this gate is marked from the marking point SN in the identifier 11 in order to designate the node in which the selection is made. The outlet of gate P.3 is connected by wire 12 to an inlet of gate P.2 in the identifier. The other inlet of gate P.2 receives the marking from wire SM. From one viewpoint, this wire SM is an internal connection of the identifier 11, as in FIG. 4. From another viewpoint, it is intended to designate, first, an outlet for the selection of a connector by means of gates P*g* of FIG. 6, and then a connector for the selection of an inlet by means of gates P*h* of FIG. 6.

During the downward marking process, distributor 6 applies pulse cycles *v*.1–5 to wires V.1–5 of translator 14 through wires 18, FIG. 7. The translator distributes each pulse to the various multiples G.1–5 according to the schedule of partially equipped crosspoints. Each multiple G.1–5 is connected to a gate P.1/1–5 and is multipled on the gates of same rank in all nodes. Gate P.1 thus receives those of pulses *v*.1–5 which characterize the connectors to which the gate has access. The other outlets of the same multiples G.1–5 distribute pulses similarly to outlet gates P.4. They convey the *v* pulse characterizing a connector to all gates P.*v*/1–5 in the node to which this connector has access.

It should be understood that it would be necessary to provide two translation grids if the schedule of partially equipped crosspoints between inlet gates and the same connectors. For instance, one schedule may be appropriate between multiples V and multiples G for inlet gates P.1, and another schedule may be appropriate between the same multiples V and other multiples similar to multiples G for outlet gates P.4.

However, gates P.1 allow a passage of the received pulses from the translator, subject to the conditions that they be available (availability wire 4) and, obviously, that they themselves be reached by the downward marking (wire 3). In other words, for each time-position allotted to a connector (and to connectors of same rank in all nodes) the pulses go through those of the inlet gates P.1/1–5 which are reached by the downward marking (wire 3), are available (wire 4), and have access to this connector (wire 5).

Each one of the connector gates P.9 receives directly its own characteristic pulse *v*. They allow these pulses to pass provided that the connector is available (wires 16). The common gate, P.10, thus allows a pulse to pass for each time-position allotted to a connector—subject to the conditions that the connector itself be available and that at least one of those inlet links 3 which have access to this connector is both marked and available. For the same time-position, gates P.4/1–5 allow the pulses from gate P.10 to pass subject to the additional condition that the corresponding outlets 9 be accessible to the corresponding connector. The operation of the memory elements M.1 and M.2 and of the second gate P.5 is the same as in the case of FIG. 3, so that a standing marking appears on the outlet links 9—beginning with the instant *t* which follows the cycle of connector pulses, subject to the condition of availability and access prevailing in the switching grid which is represented by the node.

It should be understood that the first phase of a selection in a given node is carried out during the last cycle of the downward marking. This cycle occurs when the connectors are identified by the marking which reaches the designated outlet. This is identified by the pulses which pass through gates P.1, P.9, P.10, and P.4 in this node. In this node, gate P.3 is enabled by wire 10 which is connected from marking point SN in identifier 11. Therefore, it receives the same *v* pulses which are received from gates P.4 via wire 2 during the time-positions characterizing the available connectors. These markings can reach at least one available inlet in the link 3.

Gate P.2 in identifier 11 and controlled by wire SM, allows the passage of those pulses which indicate an access to the designated outlet (as identified by the corresponding gate P*g* in the translator, FIG. 6, and designated by the corresponding marking point SS). After this last cycle of connector pulses, the framing pulse *t* is omitted, so that the marking which has reached gates P.5 cannot pass. The distributor then delivers a train of inlet pulses *h*.1–5, each of which pulses is directly applied to a gate P.1. Gate P.10 remains conductive through the operation of any means (not represented). If available, the gates reached by the downward marking deliver their characteristic pulses to gates P.3 and P.2. The latter gates are now controlled by the outlet of one of the multiples U.1–5—depending upon the gate P*h* which is enabled from one of the connector marking points SC.1–5 which designates the connector that has been selected in the first phase of the selection. Gate P.2 allows a passage of those of the *h* pulses which designate the inlet gates P.1 having access to this connector. The inlet links through which a marking may reach the designated outlet link are thus identified in turn. One of them is then selected and designated as the outlet of a preceding node, for the selection in this preceding node.

The invention also provides for a modification of FIG. 7 with a common memory flip-flop M.1 instead of a flip-flop M.1 in each outlet. This is somewhat similar to the modification of FIG. 4, as compared with the node of FIG. 3. To do so, gate P.3 of FIG. 7 could be connected to the outlet of gate P.6 of FIG. 4; the common outlet of gates P.9 of FIG. 7 could be connected to an additional inlet of gate P.6; and gate P.10 could be done away with.

While the principles of this invention have been described hereinabove in relation to particular examples of embodiment, it will be clearly understood that this description does not limit the scope of the invention.

We claim:

1. A telephone switching system comprising a plurality of crosspoints assembled into a switching network of matrices interconnected by links, path selection means comprising a figurative network of nodes, wherein each node corresponds to a crosspoint in said matrix, some of the figurative networks being incomplete as compared with the actual crosspoints in the corresponding matrices, means for extending switch paths through said figurative network in a step-by-step sequence of crosspoint selections, means for providing a cyclical distribution of time pulses representing said nodes so that the time position of a pulse defines a link, means responsive to said time pulses for translating said time pulses according to the space locations of complete parts of said matrices, and means responsive to said translated pulses for selecting a link and designating a node preceding the selected link as the starting point for the next selection.

2. The system of claim 1 and memory element means representing the incomplete parts of said matrices, and means responsive to said pulses for delivering a standing marking on the outlets of nodes associated with said memory means, whereby said path selection is limited to the links in the complete parts of said matrices.

3. The system of claim 1 and means whereby the outlets of said nodes receive pulses distributed in time under the combined control of active links and available inlets.

4. The system of claim 1 wherein said time pulses have a cycle which corresponds to the outlets of intermediate matrices in said switching network, when paths are extended through said network in one direction and to the inlets of said matrices when paths are extended through said network in another direction.

5. The system of claim 1 and translator means for distributing said pulses in time and space according to connector inlets and incompleteness of said matrices, and means for controlling said pulses in accordance with the active conditions of said links.

No references cited.

WILLIAM C. COOPER, *Primary Examiner.*